United States Patent
Gomez

(10) Patent No.: US 6,773,018 B2
(45) Date of Patent: Aug. 10, 2004

(54) SEALABLE ANTENNA HOUSING

(75) Inventor: Francisco X. Gomez, Melrose Park, IL (US)

(73) Assignee: Andrew Corp., Orland Park, IL (US)

( * ) Notice: Subject to any disclaimer, the term of this patent is extended or adjusted under 35 U.S.C. 154(b) by 210 days.

(21) Appl. No.: 09/990,419

(22) Filed: Nov. 21, 2001

(65) Prior Publication Data

US 2003/0094770 A1 May 22, 2003

(51) Int. Cl.$^7$ ............................................. F16J 15/02
(52) U.S. Cl. .......................... 277/628; 277/630; 277/644
(58) Field of Search .............................. 277/630, 637, 277/641, 644, 650, 642, 616, 626, 628; 343/872, 713, 725

(56) References Cited

U.S. PATENT DOCUMENTS

| | | | | |
|---|---|---|---|---|
| 3,779,277 A | * | 12/1973 | Papen | 137/592 |
| 5,175,873 A | * | 12/1992 | Goldenberg et al. | 455/351 |
| 5,757,327 A | * | 5/1998 | Yajima et al. | 343/713 |
| 5,900,840 A | | 5/1999 | Yajima | 343/713 |
| 5,959,585 A | | 9/1999 | Militz | 343/713 |
| 6,023,245 A | | 2/2000 | Gomez et al. | 343/725 |
| 6,054,961 A | | 4/2000 | Gong et al. | 343/713 |
| 6,157,345 A | * | 12/2000 | Hockett et al. | 343/715 |
| 6,469,678 B1 | | 10/2002 | Pullen | |

FOREIGN PATENT DOCUMENTS

| | | | |
|---|---|---|---|
| FR | 2 549 644 | 7/1983 | ............. H01P/1/32 |
| FR | 2 552 271 | 9/1983 | ............. H01Q/1/32 |
| FR | 2 575 979 | 1/1985 | ........... B60R/11/00 |

OTHER PUBLICATIONS

English language translation of abstract of French Reference 2 549 644.
Translation of front sheet of French Reference 2 552 271, including English language translation of abstract.
Translation of front sheet of French Reference 2 575 979, English language translation of abstract.

* cited by examiner

Primary Examiner—Anthony Knight
Assistant Examiner—Michael J. Kyle
(74) Attorney, Agent, or Firm—Welsh & Katz, Ltd.

(57) ABSTRACT

A watertight antenna assembly adapted for mounting on a mounting surface includes a sealing gasket having a body portion and a peripheral edge, and a continuous sidewall formed with the peripheral edge. A radome is releasably mounted to the sealing gasket forming a cavity therebetween. The sealing gasket includes a sealing projection that extends continuously along an inside portion of the sidewall and is configured to abut the radome to form a seal. A downwardly depending lip is formed of deformable material and extending continuously along a bottom portion of the sidewall. When the sealing gasket is compressed against the mounting surface, the lip sealingly deforms against the mounting surface forming a watertight seal therebetween so as to prevent ingress of water into the cavity.

28 Claims, 4 Drawing Sheets

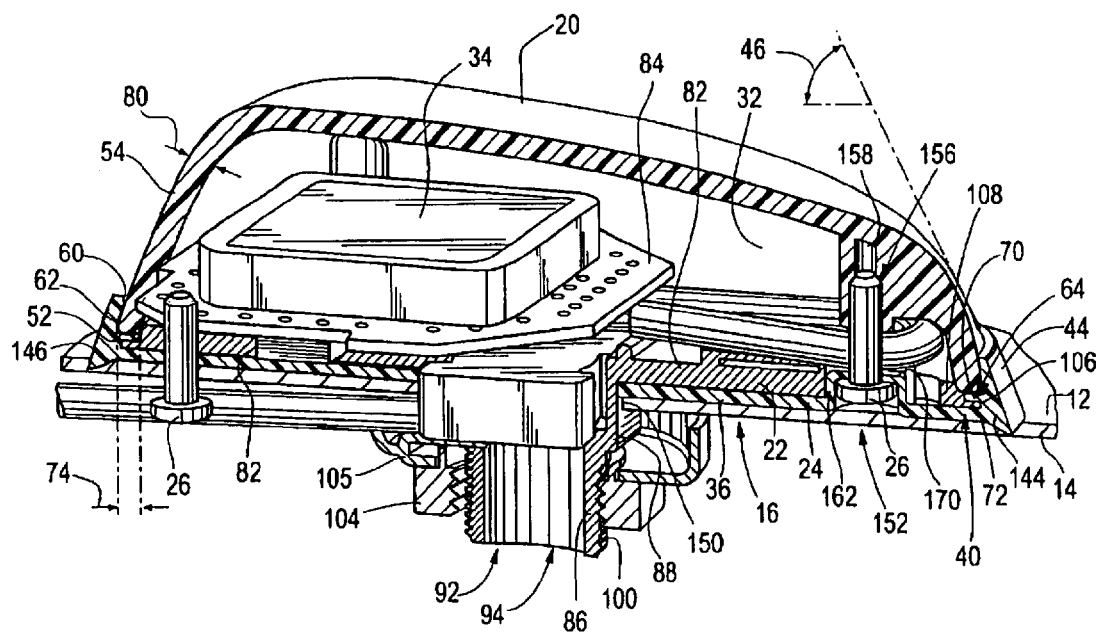
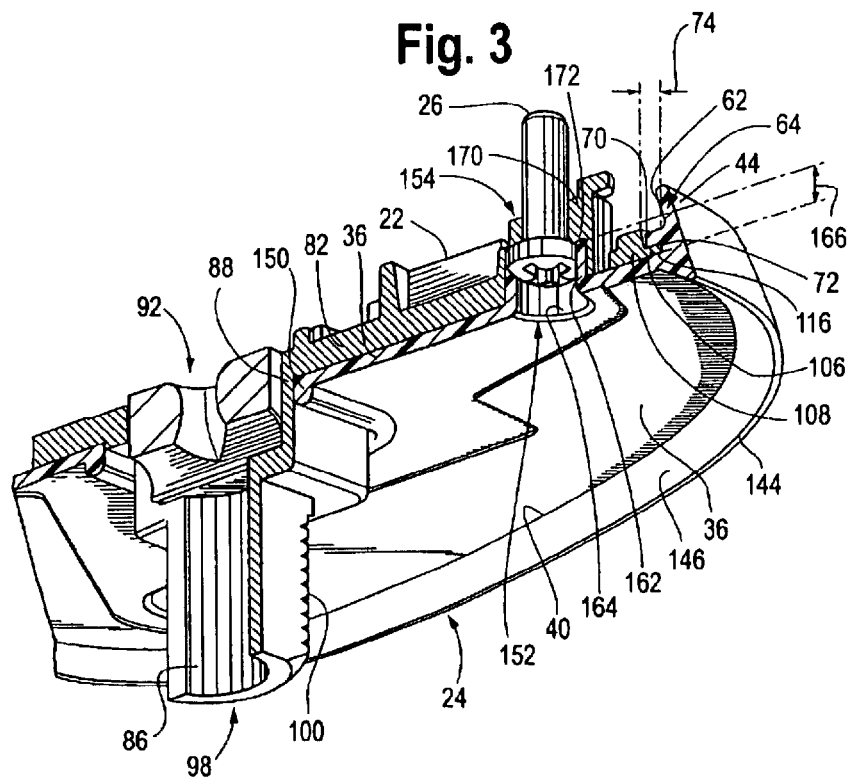

US 6,773,018 B2

SEALABLE ANTENNA HOUSING

BACKGROUND OF THE INVENTION

FIELD OF THE INVENTION

The present invention relates generally to an apparatus for mounting an antenna, and more specifically to an apparatus for sealingly mounting an antenna housing onto a mounting surface, such as a roof of a vehicle or a panel structure.

In the past, there have been various devices for mounting an antenna or antenna assembly onto a vehicle or thin panel structure. The current conventional method for mounting an antenna includes inserting a threaded stud into an aperture in the vehicle roof or panel structure and fastening or securing the stud from inside the vehicle or from under the panel structure. One installer holds the threaded stud in position, while another installer engages a threaded lock-nut onto the threaded stud from the interior of the vehicle or from under the panel structure.

Further, antenna mounting apparatus must be water tight to prevent the ingress of water into the chamber housing the electrical components, and to prevent the ingress of water through the mounting aperture in the vehicle roof or panel structure through which antenna wires pass. Known methods are cumbersome and some require special adhesives and application of curable waterproofing material. Such material is prone to failure over time and is difficult to remove. To seal the chamber that houses the electronic components, known apparatus use multiple parts, which typically include O-rings, gaskets, washers and the like. Such multi-part housings are difficult and relatively time-consuming to install. Additionally, use of many parts increases the likelihood of water ingress. Therefore, there is a need for an antenna mounting apparatus having a minimum number of parts that fully seals the electronic components within the component chamber and prevents water ingress through the mounting hole in the vehicle roof or panel structure.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 2 is a cross-sectional view of a specific embodiment of a sealed antenna housing shown mounted on a mounting surface;

FIG. 3 is a perspective view of a specific embodiment of the sealing gasket and the baseplate;

DETAILED DESCRIPTION OF THE INVENTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

It is to be further understood that the title of this section of the specification, namely, "Detailed Description of the Invention" relates to Rules of the U.S. Patent and Trademark Office, and is not intended to, does not imply, nor should be inferred to limit the subject matter disclosed herein or the scope of the invention.

Figure 1:
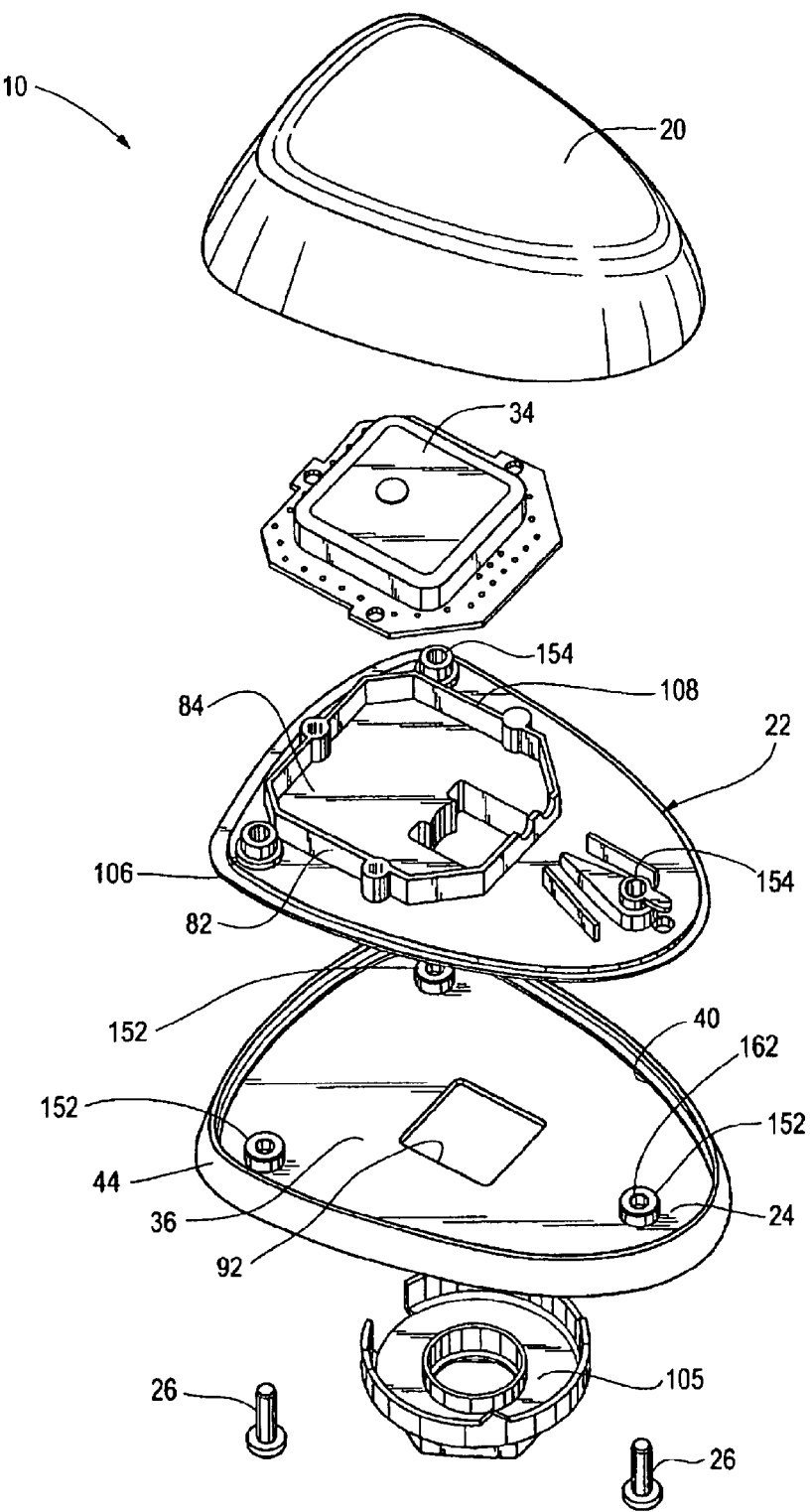
FIG. 1 is an exploded perspective view of a specific embodiment of a sealed antenna housing.

Referring now to FIGS. 1 and 2, FIG. 1 is an exploded view of an antenna housing assembly 10, generally, while FIG. 2 shows the antenna housing mounted on an external surface 12 of a mounting panel 14. The antenna housing assembly 10 is compressed against the external surface 12 of the mounting panel 14 via application of compressive force against an inside surface 16 of the mounting panel 14, as will be described in greater detail hereinafter. The antenna housing assembly 10 may be mounted, for example, on a vehicle roof to provide a housing for a variety of components, such as cellular telephone antennas, GPS antennas, AM/FM antennas, and the like. The antenna mounting assembly 10, however, is not limited to use on vehicles, and it is contemplated to be used on any suitable structure, such as on thin roof or other panel-like structures. Such panel-like structures may include a roof of a prefabricated equipment shack, equipment containers, vending machines, and the like, which typically have thin metal panels or roofs. Preferably, the panel-like structures are non-porous, such as metal or plastic.

The antenna housing assembly 10 includes a radome 20 (also referred to covering or dome), a baseplate 22, a sealing gasket 24, and radome fasteners 26. The radome 20 is releasably mounted to the sealing gasket 24 forming a watertight cavity 32 for housing electronic components 34 therein, such as an antenna. Any components 34, however, may be housed within the cavity 32, depending upon the application.

The sealing gasket 24 is preferably formed as a one-piece structure in an injection molding process, but any suitable manufacturing process may be used. The sealing gasket 24 material may be a thermoplastic elastomer (TPE), such as rubber, natural rubber, polyurethane or a combination of rubber and polyurethane. Such a combination is typically manufactured from about ten percent rubber and ninety percent polyurethane. Preferably, the sealing gasket 24 is formed of a combination of natural rubber and polyurethane, and may be formed of, for example, SANTOPRENE, available from Advanced Elastomer Systems or ELASTOLLAN, available from BASF Corp. of Germany. Alternately, SARLINK, an impact-modified polypropylene available from DSM Plastics Corporation, may be used. The sealing gasket 24 material preferably has a durometer of between 80 Shore A to 60 Shore D, but may also have a durometer range of between 60 Shore A and 74 Shore D. The radome 20 is preferably formed of hard plastic material, such as PCABS (polycarbonate mixed with acrylonitrile-butadine-styrene), and may also be manufactured in an injection molding process. Note that the sealing gasket is "dry" and is not used in conjunction with silicone or other sealant. Compression of the antenna housing assembly against the mounting panel 14 is sufficient to effect a total liquid seal without use of adhesives, oils, sealants and the like.

Note that the invention is referred to generally as the antenna housing assembly 10, but it is not limited to housing antennas or electrical components. The sealing gasket 24 and radome or dome 20 may used to house any components within the cavity 32 where it is desired to house such components in a watertight enclosure and then mount the enclosure on a mounting surface. Accordingly, the scope of the invention is not limited to antenna housings or housings for electrical components. The present invention is also directed generally to structures that form watertight seals.

Referring now to FIGS. 1–4, FIGS. 3 and 4 show the sealing gasket 24 in greater detail. The sealing gasket 24 includes a surface portion or body portion 36 defined by a peripheral edge 40, and a gasket sidewall 44 that extends continuously about the peripheral edge 40. The gasket sidewall 44 is preferably integrally formed with the body portion 36 and slopes upwardly and inwardly from the peripheral edge 40 of the body portion 36, preferably defining an inside angle 46 (FIG. 2) of about between sixty degrees and ninety degrees with the peripheral edge 40 of the body portion 36. Note that such angle 36 may vary about the peripheral edge 40 because the radome 20 may not be uniformly hemispherical in shape, and may have a cross-sectional taper from front to back for purposes of reduced air-drag when mounted on a vehicle.

The sealing gasket 24 is dimensioned to receive the radome 20 such that a perimeter edge 52 (FIG. 2) of the radome is received within the body portion 36. The radome 20 has a sidewall 54 that slopes inwardly at an angle that substantially matches the angle 36 of the gasket sidewall 44. This forms an interference fit between an outside surface 60 of the radome 20 and an inside surface 62 of the gasket sidewall 44. This, in part, prevents the ingress of water into the cavity 32.

The sealing gasket 24 further includes a sealing projection 64 that extends continuously along the inside surface 62 of the gasket sidewall 44 and is preferably formed integrally therewith. The sealing projection 64 is configured to sealingly abut the perimeter edge 52 (FIG. 1) of the radome 20 when the radome 20 is received within the body portion 36, as will be described in greater detail below.

The sealing projection 64 is preferably in the form of a tongue 70 (or ledge) that extends inwardly from the gasket sidewall 44 and defines a circumferential groove 72 below the tongue, that is, a groove between the tongue 70 and the body portion 36. The tongue 70 preferably extends inwardly for a length 74 (FIG. 3) about equal to a thickness 80 of the radome 20 at its perimeter edge 52. Accordingly, the tongue 70 contacts the perimeter edge 52 of the radome 20 along its entire surface length 74 creating a seal that circumscribes the entire perimeter edge 52 of the radome 20. Of course, the length 74 of the tongue 70 need not be exactly equal to the thickness 80 of the radome 20. The portion of the gasket sidewall 24 above the tongue 70 essentially defines a mouth configured to receive the perimeter edge 52 of the radome 20.

Referring now to the baseplate 22, the baseplate 22 includes a baseplate body 82 having a planar portion 84 upon which the electrical components 34 may be mounted. A shaft portion 86 is attached to a bottom portion 88 of the baseplate body 82. The shaft portion 86 is preferably integrally formed with the baseplate body 82. Alternatively, the shaft portion 86 may be attached to the baseplate body 82 by rivets, screws, bolts, threaded portions, welds, and the like.

The shaft portion 86 is aligningly received through an installation orifice 92 in the sealing gasket 24, and is also received through an aperture 94 in the mounting panel 14. Typically, a small hole is cut in the mounting panel 14, such as the roof of a vehicle or other structure, which is dimensioned to receive the shaft portion 86. A distal end 98 of the shaft portion 86 includes threads 100, which are configured to receive a correspond nut 104. A collar 105 (FIGS. 1 and 2) may be fitted over the threaded portion 100 of the shaft portion 86 so that as the nut 104 is tightened, the shaft portion will not slip or rotate. This permits the antenna housing assembly 10 to be installed by one installer. Tightening of the nut 104 against the collar 105 creates downward force on the baseplate 22 and the sealing gasket 24 so that a seal is formed between the sealing gasket 24 and the mounting panel 14, as will be described in greater detail hereinafter.

Figure 4:
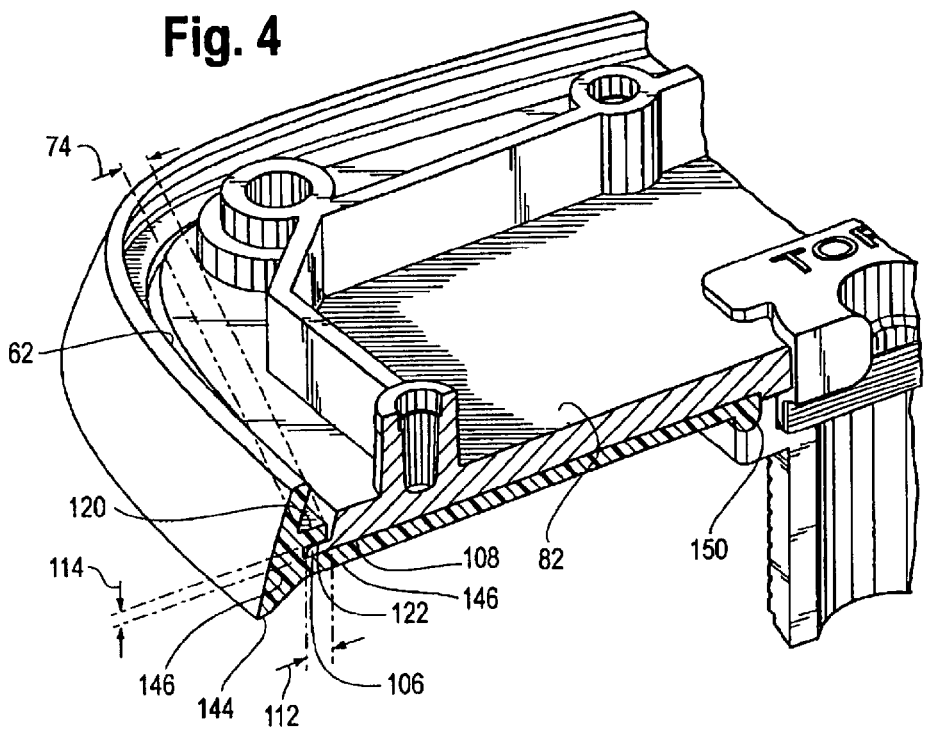
FIG. 4 is a perspective view of the sealing gasket and baseplate of FIG. 3.

As best shown in FIGS. 2 and 4, the baseplate 22 include a radial lip 106 that extends outwardly from a peripheral edge 108 of the baseplate 22, and has a predetermined lateral width 112 (FIG. 4). The lateral width 112 (FIG. 4) of the radial lip 106 is substantially equal to the length 74 of the tongue 70, but may, of course, be slightly smaller or larger. Accordingly, the radial lip 106 may extend to the inside surface 62 (FIG. 3) of the gasket sidewall 44. The radial lip 106 may have a reduced thickness or a height 114 (FIG. 3) relative to the thickness of baseplate body 82, and may be, for example, about one-fourth of the thickness of the baseplate body 82. The height 114 of the radial lip 106 may be roughly equal to a height 116 of the circumferential groove 72. Thus, the length 74 of the tongue 70, the lateral width 112 of the radial lip 106, and the thickness 80 (FIG. 3) of the perimeter edge 52 of the radome 20 may be about equal.

When the baseplate 22 is received within the sealing gasket 24, the radial lip 106 may be received within the circumferential groove 72. Contact is continuously made between the radial lip 106 and the tongue 70 along the entire peripheral edge 108 of the base plate, as the radial lip is received within the circumferential groove 72. When the radome 20 is compressed against the sealing gasket 24 via the fasteners 26, the perimeter edge 52 of the radome 20 contacts an upper surface 120 (FIG. 4) of the tongue 70. A lower surface 122 of the tongue 70, in turn, contacts the radial lip 106. Thus the tongue 70 may be sandwiched between and compressed between the perimeter edge 52 (FIG. 1) of the radome 20 and the radial lip 106. Such compression forms a watertight seal between the sealing gasket 24 and the radome 20, which prevents the ingress of water into the cavity 32. Additionally, the compression of the tongue 70 between the radial lip 106 and the perimeter edge 52 of the radome 20 further urges the inside portion 62 of the sealing gasket sidewall 44 against the outside surface 60 (FIG. 1) of the sidewall of the radome 20, further sealing the antenna assembly 10 along the radome 20/sealing gasket 24 interface.

Referring now to FIGS. 2, 4, 5A–5C, FIG. 5A shows and enlarged cross-sectional view of the perimeter edge 52 of the radome 20, which is shown disposed above the sealing gasket 24. Note that preferably, the perimeter edge 52 of the radome is not completely flat. In particular, the perimeter edge 52 has a projection or radome lip 126 that "bites" into the tongue 70 when the radome 20 is compressed against the sealing gasket 24. The projection 126 effectively increases the surface area of contact between the perimeter edge 52 and the tongue 70, thus increasing the water resistance of the seal. Because the sealing gasket 24, and of course, the tongue 70 are formed of resilient material, the compression of the perimeter edge 52 against the sealing gasket 24 is balanced by the restorative forces of sealing gasket, which adds to the water ingress resistance. Additionally, this increases the overall structural strength of the assembly and prevents the radome from being physical dislodged.

Figure 5A:
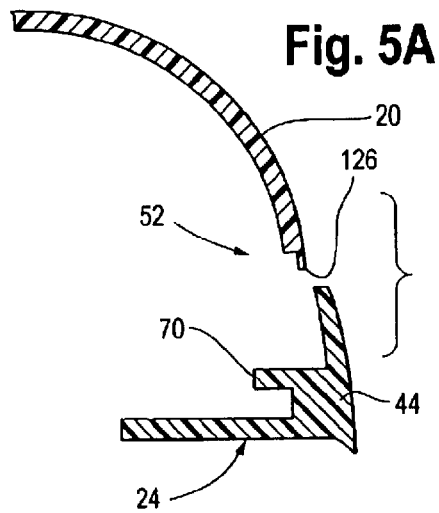
FIG. 5A is an enlarged cross-sectional view of a specific embodiment of the radome.
Figure 5B:
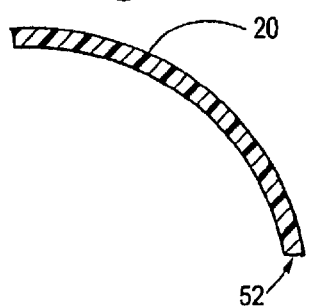
FIGS. 5B and 5C are enlarged cross-sectional views of alternate embodiments of the radome.

Alternatively, as shown in FIG. 5B, the perimeter edge 52 may be serrated, which again increases the surface area of contact between the perimeter edge 52 and the tongue 70. This further creates a watertight seal. The gripping capacity of the radome against the sealing gasket is also increased, which minimizes the likelihood that the radome will become physically dislodged.

Figure 5C:
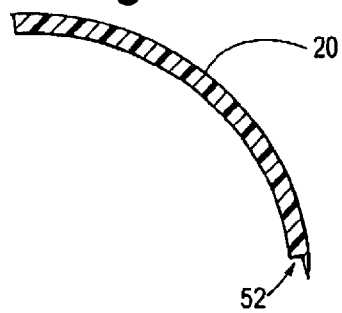

As shown in FIG. 5C, the perimeter edge may have a chisel-point cross-section. Again, this increases the surface area of the contact portion and the gripping capacity, as described above. Again, this minimizes the likelihood that the radome will become physically dislodged.

Figure 6:
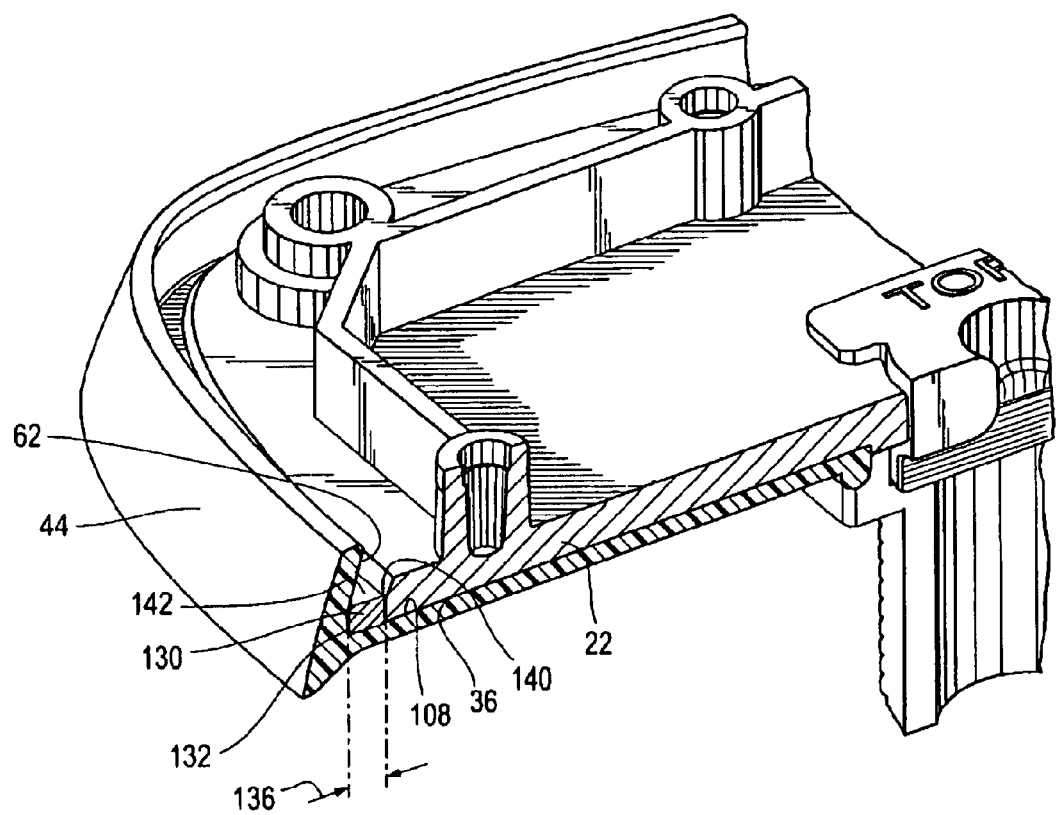
FIG. 6. is an alternate embodiment of a sealing gasket having a shoulder seal.

Referring now to FIGS. 2 and 6, FIG. 6 shows an alternate embodiment having the sealing projection 64 (FIG. 2) in the form of a gasket shoulder 130 (FIG. 6), which forms a seal between the radome 20 and the sealing gasket 24. Like reference numerals will be used to denote like structures. In this embodiment, the shoulder 130 may extend continuously along the inside surface 62 of the gasket sidewall 44, and is configured to sealingly abut the perimeter edge 52 of the radome 20 when the radome is received within the body portion 36. The shoulder 130 is preferably formed at a "corner" 132 or intersection of the gasket sidewall 44 and the body portion 36 of the sealing gasket 24. A width 136 of the shoulder 130 may be dimensioned to roughly equal the thickness 80 (FIG. 2) of the perimeter edge 52 of the radome 20.

In the specific embodiment of FIG. 6, the baseplate 22 does not include the radial lip 106 (FIG. 2). Rather, the peripheral edge 108 of the baseplate 22 may extend to an upright portion 140 of the shoulder 130. When the radome 20 is compressed against the sealing gasket 24 via the fasteners 26, the perimeter edge 52 of the radome 20 contacts a horizontal portion 142 of the shoulder 130. Such compression forms a watertight seal between the sealing gasket 24 and the radome 20, which prevents the ingress of water into the cavity 32. Additionally, the compression of the shoulder 130 by the perimeter edge 52 of the radome 20 further urges the inside portion 62 of the gasket sidewall 44 against the outside surface 60 of the sidewall 54 of the radome 20, further sealing the antenna assembly 10 along the radome 20/sealing gasket 24 interface.

Referring back to FIGS. 1–4, the sealing gasket 24 may include a downwardly depending lip 144 formed of deformable material extending continuously along a bottom portion 146 of the gasket sidewall 44. Preferably, the lip 144 is integrally formed with the sealing gasket 24. As described above, the baseplate 22 may be received within the sealing gasket 24 such that downward force applied to the shaft portion 86 of the baseplate 22 compresses the baseplate and the sealing gasket 24 against the external surface 12 (FIG. 2) of the mounting panel 14. Such compression sealingly deforms the lip 144 against the external surface 12 and causes the lip 144 to spread. This forms a watertight seal between the mounting panel 14 and the sealing gasket 24 to prevent ingress of water into the cavity 32 through the perimeter of the sealing gasket 24.

Note that compression of the sealing gasket 24, and in particular, compression and deformation of the downwardly depending lip 144 against the external surface 12 of the mounting panel 14, transfers compressive force through the lip and upward through the gasket sidewall 44. Due the sloping angle of the gasket sidewall 44, this further urges the inside portion 62 of the gasket sidewall against the outside surface 60 (FIG. 1) of the sidewall of the radome 20. Because the sealing gasket 24 is a one piece structure, this causes the gasket sidewall 44 to close against or pinch the outside surface 60 (FIG. 1) of the radome, further maintaining a watertight seal.

As a further sealing protection mechanism, a raised bead 150 (FIGS. 2–4) may be formed around the installation orifice 92 in the bottom side of the body portion 36 of the sealing gasket 24. The raised bead 150 may contact the external surface 12 of the mounting panel 14 and is also compressed when the sealing gasket 24 is compressed by the baseplate 22. The raised bead 150 is preferably integrally formed from the material from which the sealing gasket 24 is formed. Thus, if any water should happen to penetrate the lip 144 and ingress under the sealing gasket 24, the sealing bead would prevent the water from entering the cavity 32 through the installation orifice 92.

As best shown in FIGS. 1 and 3, a plurality of fastener apertures 152 are disposed in the body portion 36 of the sealing gasket 24. Preferably, three fastener apertures 152 are included, however, any suitable number of fastener apertures may be included. The fastener apertures 152 are in axial alignment with three corresponding throughbores 154 in the baseplate 22. The fasteners 26, such as for example, screws or bolts, are sealingly received through the fastener apertures 152 and through the throughbores 154, and align with three corresponding bosses 156 (FIG. 1) formed in the radome 20. Each boss 156 includes a central threaded hole 158 (FIG. 1) configured to receive the fastener 26. Note that preferably, the throughbores 154 are not threaded such that the fasteners 26 freely pass through the throughbores 154 without friction or gripping. Accordingly, when the fasteners 26 are tightened, the baseplate 22 is compressed between the perimeter edge 52 of the radome 20 and the sealing gasket 24.

Referring in particular to FIGS. 2 and 3, a plurality of sleeves 162 are shown to further seal the fastener apertures 152. The sleeves 162 may be contiguously and integrally formed with an inside peripheral edge 164 of the fastener aperture 152, and extend upwardly having a predetermined height 166. The diameter of the fastener apertures 152, and hence the diameter of the sleeve 162 is dimensioned to be slightly smaller that the diameter of the fastener 26 received therethrough. Because, however, the material from which the sealing gasket 24 (and sleeves 162) are formed is deformable, the fastener 26 forms an interference fit with the fastener aperture 152 and the sleeve 162. This further prevents potential ingress of water into the cavity 32.

As best shown in FIGS. 1 and 3, the baseplate 22 includes three throughbores 154 in alignment with the fastener apertures 112. Each throughbore additionally include an annular recess 170, which terminates at an annular shoulder 172. The diameter of the annular recess 170 is dimensioned to receive a portion of the sleeve 162. When the baseplate 22 is secured between the sealing gasket 24 and the radome 20 via action of the fasteners 26, the sleeves 162 project into the annular recess 170 and abut the annular shoulder 172. This forms a watertight seal that further prevents the ingress of water into the cavity 32 through the fastener apertures 152.

Specific embodiments of a sealed antenna housing according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A sealing gasket for sealing an enclosure assembly, the enclosure assembly adapted for mounting on a mounting surface, the sealing gasket comprising:

a substantially planar body portion having a continuous sidewall;

a lip formed of deformable material depending downwardly from a bottom portion of the sidewall;

a sealing projection extending continuously along an inside portion of the sidewall;

the sealing projection configured to sealingly abut a corresponding peripheral edge of a covering portion, the covering portion and the body portion defining a chamber;

a plurality of apertures disposed in the body portion, each aperture configured to sealingly receive a fastener such that a watertight seal is formed between the sealing projection and the covering portion when the fasteners compress the covering portion against the sealing gasket; and wherein when the lip is compressed against the mounting surface the lip sealingly deforms forming a watertight seal with the mounting surface so as to prevent ingress of water into the chamber.

2. A watertight assembly for housing components, the assembly adapted for mounting on a mounting surface, the assembly comprising:

a sealing gasket having a surface portion defined by a peripheral edge, and a side wall extending continuous about the peripheral edge;

a radome releasably mounted to the sealing gasket forming a cavity therebetween, the cavity adapted to house the components;

the sealing gasket having a sealing projection extending continuously along an inside portion of the sidewall, the sealing projection configured to sealingly abut a perimeter edge of the radome;

a plurality of fastener apertures disposed in the surface portion, each fastener aperture configured to sealingly receive a fastener, the fasteners configured to compress the radome against the sealing projection to form a watertight seal therebetween;

the sealing gasket having a downwardly depending lip formed of deformable material extending continuously along a bottom portion of the sidewall;

a baseplate disposed within the cavity and having a shaft portion fixedly attached thereto, the baseplate configured to receive the components thereon;

the shaft portion aligningly received through an installation orifice in the sealing gasket and received through the mounting surface; and wherein application of downward force on the shaft portion compresses the sealing gasket against the mounting surface to sealingly deform the lip against the mounting surface so as to form a watertight seal to prevent ingress of water into the cavity.

3. The assembly according to claim 2 wherein the shaft portion-includes a threaded portion configured to receive a nut such that tightening of the nut creates the downward force so as to form a seal between the sealing gasket and the mounting surface.

4. The assembly according to claim 2 wherein the shaft portion is integrally formed with the base plate.

5. The assembly according to claim 2 wherein a peripheral edge of the baseplate is contiguous with the peripheral edge of the sealing gasket such that downward force applied to the baseplate causes the lip to sealing deform against the mounting surface.

6. The assembly according to claim 2 wherein the baseplate includes a plurality of throughbores in alignment with the fastener apertures for receiving the fasteners therethrough.

7. The assembly according to claim 2 wherein the baseplate includes a radial lip outwardly extending from a peripheral edge of the baseplate.

8. The assembly according to claim 2 wherein the sealing gasket further includes a sleeve contiguously formed with an inside peripheral edge of the fastener aperture, the sleeve extending upwardly for a predetermined distance forming an interference fit with the fastener.

9. The assembly according to claim 8 wherein the sleeve is integrally formed with the inside peripheral edge of the aperture.

10. The assembly according to claim 8 wherein the sleeve prevents water from entering the cavity through the fastener apertures.

11. The assembly according to claim 8 wherein the baseplate includes a plurality of throughbores in alignment with the sleeves, each throughbore including a recessed portion terminating in a shoulder such that an upper annular surface of the sleeve contacts the shoulder so as to form a watertight seal between the sleeve and the baseplate.

12. The assembly according to claim 2 wherein the lip is integrally formed with the sealing gasket.

13. The assembly according to claim 2 wherein the sealing gasket is formed in a one piece injection molded process.

14. The assembly according to claim 2 wherein the sealing gasket is formed from a combination of rubber and polyurethane.

15. The assembly according to claim 2 wherein the sealing gasket is formed from material selected from the group consisting of rubber, natural rubber, polyurethane and thermoplastic elastomer.

16. The assembly according to claim 2 wherein the sealing gasket is formed from material having a durometer of between 60 Shore A and 74 Shore D.

17. The assembly according to claim 2 wherein the sealing projection is a shoulder formed between the surface portion and the sidewall.

18. The assembly according to claim 2 wherein the sealing projection is a shoulder formed continuously along the peripheral edge of the surface portion.

19. The assembly according to claim 2 wherein the sealing projection is a shoulder formed continuously along an intersection defined by the sidewall and the peripheral edge of the surface portion.

20. The assembly according to claim 17 wherein the perimeter edge of the radome abuts the shoulder to form a watertight seal therebetween.

21. The assembly according to claim 17 wherein the fasteners compress the perimeter edge of the radome against the shoulder to form a watertight seal.

22. The assembly according to claim 2 wherein the sealing projection is a tongue that extends inwardly from a portion of the sidewall forming a circumferential groove between the tongue and the surface portion of the sealing gasket.

23. The assembly according to claim 2 wherein the sealing projection is a tongue that extends inwardly from a portion of the sidewall forming a circumferential groove between the tongue and the surface portion of the sealing gasket, and wherein the baseplate includes a radial lip outwardly extending from a peripheral edge of the baseplate.

24. The assembly according to claim 23 wherein the circumferential groove receives the radial lip of the baseplate.

25. The assembly according to claim 24 wherein the circumferential groove receives the radial lip continuously along the peripheral edge of the surface portion.

26. The assembly according to claim 23 wherein the tongue is sandwiched between the radial lip of the baseplate and the perimeter edge of the radome.

27. The assembly according to claim 23 wherein the fasteners compress the tongue between the radial lip of the base plate and the perimeter edge of the radome to form a watertight seal between the radome and the sealing gasket.

28. The assembly according to claim 27 wherein the compression of the tongue between the radial lip and the perimeter edge of the radome further urges the inside portion of the sidewall against an outside surface portion of the radome.

* * * * *